United States Patent
Imaizumi (10) Patent No.: US 9,800,035 B2
(45) Date of Patent: Oct. 24, 2017

(54) WATER DRAINAGE STRUCTURE, ELECTRONIC COMPONENT MODULE, AND ELECTRICAL CONNECTION BOX

(71) Applicant: Yazaki Corporation, Tokyo (JP)

(72) Inventor: Yoshihito Imaizumi, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 15/360,407

(22) Filed: Nov. 23, 2016

(65) Prior Publication Data

US 2017/0163015 A1 Jun. 8, 2017

(30) Foreign Application Priority Data

Dec. 2, 2015 (JP) ................................ 2015-235470

(51) Int. Cl.
| | |
|---|---|
| H05K 7/02 | (2006.01) |
| H05K 7/04 | (2006.01) |
| H02G 3/08 | (2006.01) |
| B60R 16/023 | (2006.01) |

(52) U.S. Cl.
CPC ............ *H02G 3/088* (2013.01); *H02G 3/081* (2013.01); *B60R 16/0239* (2013.01); *H02G 3/086* (2013.01)

(58) Field of Classification Search
CPC .......... H05K 7/02; H05K 5/03; H05K 5/0073; H05K 5/0221; B60R 16/023; B60R 16/0239; H02G 3/086; H02G 3/081; H02G 3/088

USPC .......................................... 361/807, 809, 810
See application file for complete search history.

(56) References Cited

U.S. PATENT DOCUMENTS

| | | | | |
|---|---|---|---|---|
| 4,952,753 A | * | 8/1990 | Hayashi | ................ B60R 16/027 174/535 |
| 7,950,931 B2 | * | 5/2011 | Nakanishi | .............. H02G 3/088 439/76.2 |
| 9,356,385 B2 | * | 5/2016 | Kobayashi | ......... H01R 13/5202 |
| 2008/0299800 A1 | * | 12/2008 | Yoshida | ............. H01R 13/5227 439/76.2 |
| 2010/0326719 A1 | * | 12/2010 | Ejima | ................. B60R 16/0238 174/535 |
| 2015/0250070 A1 | | 9/2015 | Anami | |
| 2015/0305181 A1 | * | 10/2015 | Kurita | .................... H05K 7/026 361/679.01 |

FOREIGN PATENT DOCUMENTS

JP 2014-75918 A 4/2014

* cited by examiner

*Primary Examiner* — Hung S Bui
(74) *Attorney, Agent, or Firm* — Kenealy Vaidya LLP (57) ABSTRACT

A water drainage structure includes a block and a cover. The block holds an electronic component at an upper portion thereof. The cover has inner wall portions that face side wall portions of the block. The cover integrally covers the electronic component and the block from above. At least either the side wall portions and the inner wall portions have upper opposing surfaces facing the other of the side wall portions and the inner wall portions at first distances disabling a lift of water by a capillary phenomenon, and raised portions raised from lower portions of the upper opposing surfaces toward the other.

6 Claims, 8 Drawing Sheets

WATER DRAINAGE STRUCTURE, ELECTRONIC COMPONENT MODULE, AND ELECTRICAL CONNECTION BOX

CROSS-REFERENCE TO RELATED APPLICATION(S)

The present application claims priority to and incorporates by reference the entire contents of Japanese Patent Application No. 2015-235470 filed in Japan on Dec. 2, 2015.

BACKGROUND OF THE INVENTION

1. Field of the Invention

The present invention relates to a water drainage structure, an electronic component module, and an electrical connection box.

2. Description of the Related Art

A known technique prevents entry of water into the inside of a cover that covers to house thereinside an electronic component. Japanese Patent Application Laid-open No. 2014-75918, for example, discloses an arrangement of an electrical connection box, in which an opposing surface that faces an inner surface of a cover for a main unit in which a circuit board is disposed has a water trap hole that is recessed toward the inner surface and an opposing distance between an upper opening edge portion disposed superjacently in a vertical direction in the water trap hole and the inner surface is set to be greater than an opposing distance between a lower opening edge portion disposed subjacently in the vertical direction in the water trap hole and the inner surface.

In a configuration in which a cover that integrally covers a block for holding an electronic component and the electronic component from above, the technique to prevent entry of water into the inside of the cover needs improvement. Preferably, for example, water that has entered through a gap between the cover and the block can be appropriately discharged so as not to reach the electronic component.

SUMMARY OF THE INVENTION

It is an object of the present invention to provide a water drainage structure, an electronic component module, and an electrical connection box that can appropriately discharge water that has entered through a gap between a cover and a block.

A water drainage structure according to one aspect of the present invention includes a block that holds an electronic component at an upper portion thereof; and a cover that has an inner wall portion facing a side wall portion of the block, the cover integrally covering the electronic component and the block from above, wherein at least either one of the side wall portion and the inner wall portion has an upper opposing surface facing the other of the side wall portion and the inner wall portion at a first distance disabling a lift of water by a capillary phenomenon, and a raised portion raised from a lower portion of the upper opposing surface toward the other, the raised portion has a lower opposing surface that faces the other at a second distance that is shorter than the first distance, a step surface that connects the lower opposing surface with the upper opposing surface and that faces upward, and a passage portion that provides communication between a space above the raised portion and a space below the raised portion and that connects to the step surface, and the step surface is inclined toward the passage portion.

According to another aspect of the present invention, in the water drainage structure, it is preferable that the second distance enables a lift of water by a capillary phenomenon.

According to still another aspect of the present invention, in the water drainage structure, it is preferable that the step surface extends in a width direction of the side wall portion and the inner wall portion and is curved downwardly toward the passage portion in the width direction.

An electronic component module according to still another aspect of the present invention includes an electronic component; a block that holds the electronic component at an upper portion thereof; and a cover that has an inner wall portion facing a side wall portion of the block, the cover integrally covering the electronic component and the block from above, wherein at least either one of the side wall portion and the inner wall portion has an upper opposing surface facing the other of the side wall portion and the inner wall portion at a first distance disabling a lift of water by a capillary phenomenon, and a raised portion raised from a lower portion of the upper opposing surface toward the other, the raised portion has a lower opposing surface that faces the other at a second distance that is shorter than the first distance, a step surface that connects the lower opposing surface with the upper opposing surface and that faces upward, and a passage portion that provides communication between a space above the raised portion and a space below the raised portion and that connects to the step surface, and the step surface is inclined toward the passage portion.

An electrical connection box according to still another aspect of the present invention includes an electronic component; a block that holds the electronic component at an upper portion thereof; a cover that has an inner wall portion facing a side wall portion of the block, the cover integrally covering the electronic component and the block from above; and a frame that holds thereinside an electronic component module including the electronic component, the block, and the cover, wherein at least either one of the side wall portion and the inner wall portion has an upper opposing surface facing the other of the side wall portion and the inner wall portion at a first distance disabling a lift of water by a capillary phenomenon, and a raised portion raised from a lower portion of the upper opposing surface toward the other, the raised portion has a lower opposing surface that faces the other at a second distance that is shorter than the first distance, a step surface that connects the lower opposing surface with the upper opposing surface and that faces upward, and a passage portion that provides communication between a space above the raised portion and a space below the raised portion and that connects to the step surface, and the step surface is inclined toward the passage portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following details, with reference to the accompanying drawings, a water drainage structure, an electronic component module, and an electrical connection box according to an embodiment of the present invention. The embodiment to be described hereunder is not intended to limit the present invention. Besides, elements of the embodiment to be described hereunder include elements that can readily be conceived by those skilled in the art or that are substantially identical.

Embodiment

Figure 1:
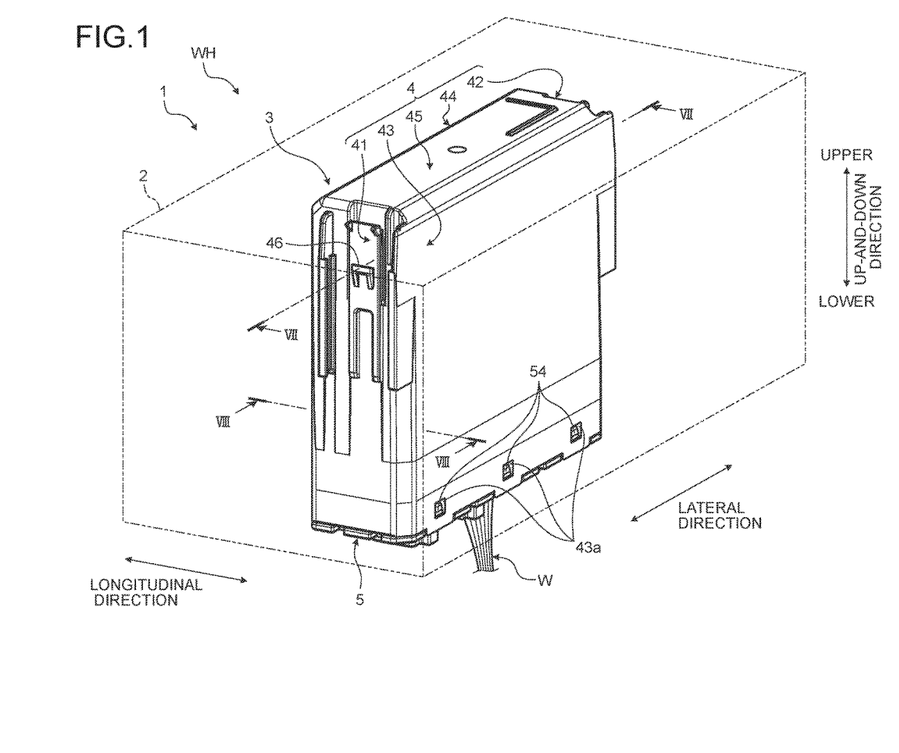
FIG. 1 is a perspective view of an electrical connection box according to an embodiment.
Figure 2:
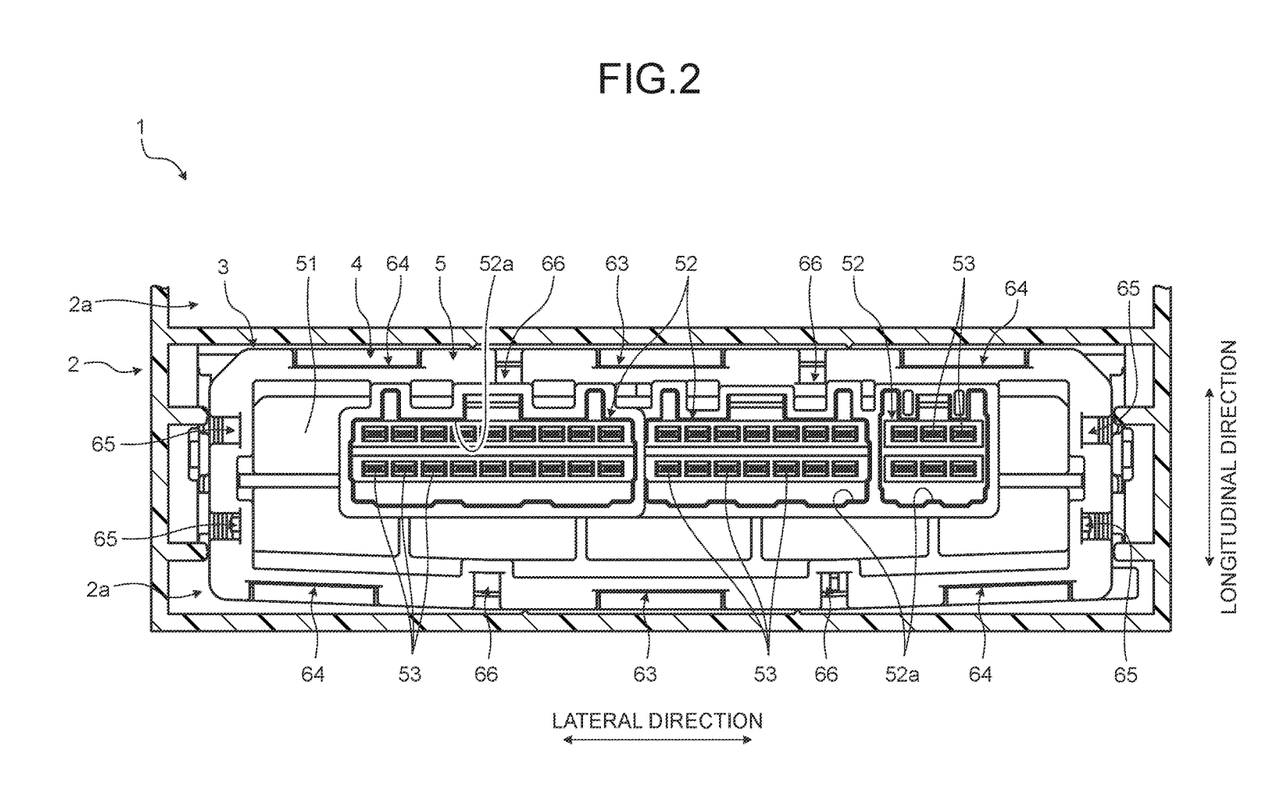
FIG. 2 is a bottom view of the electrical connection box according to the embodiment.
Figure 3:
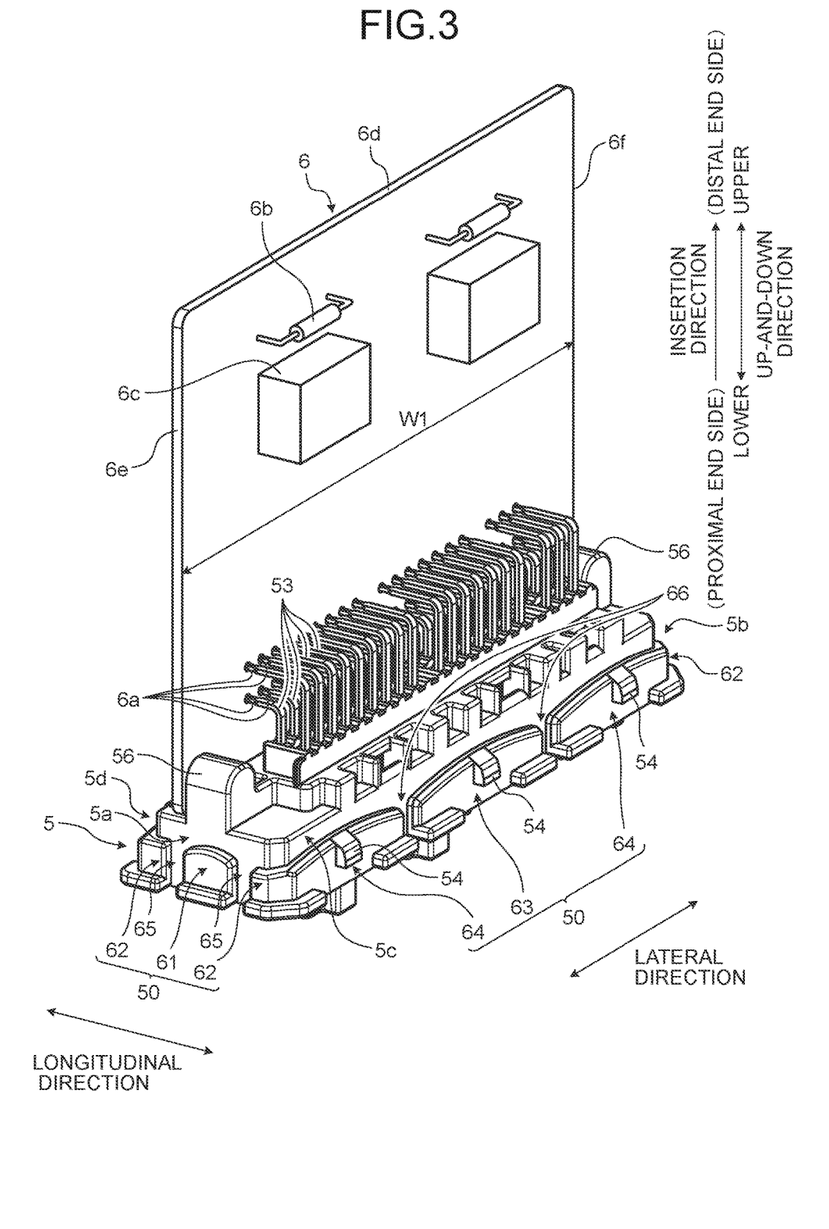
FIG. 3 is a perspective view of a substrate and a connector block according to the embodiment.
Figure 4:
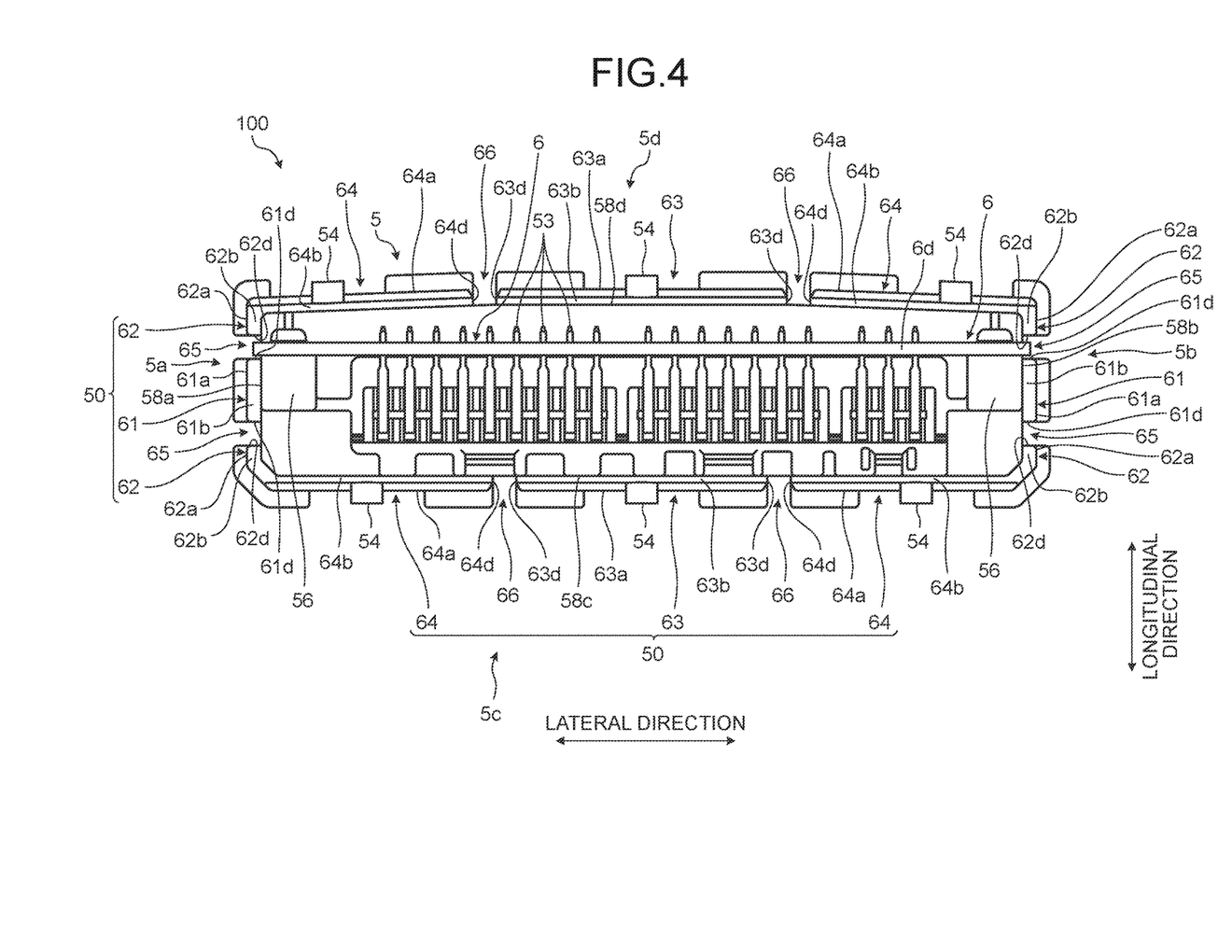
FIG. 4 is a plan view of the substrate and the connector block according to the embodiment.
Figure 5:
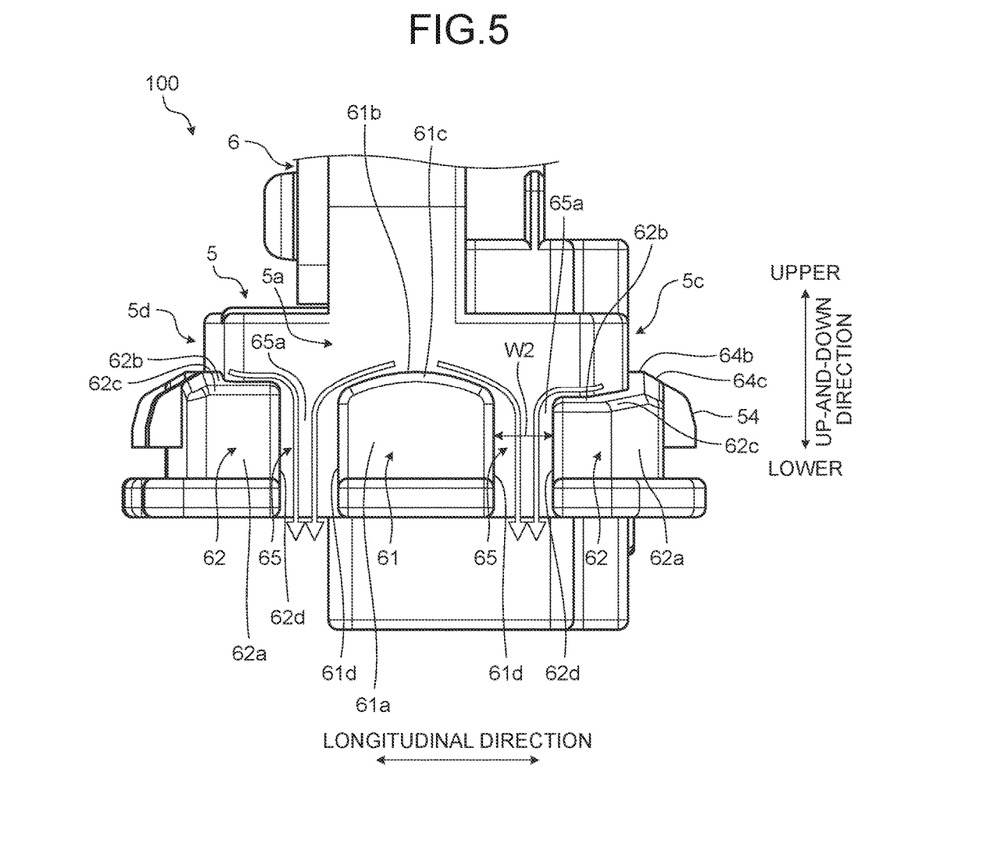
FIG. 5 is a side elevational view of main components of the connector block according to the embodiment.
Figure 6:
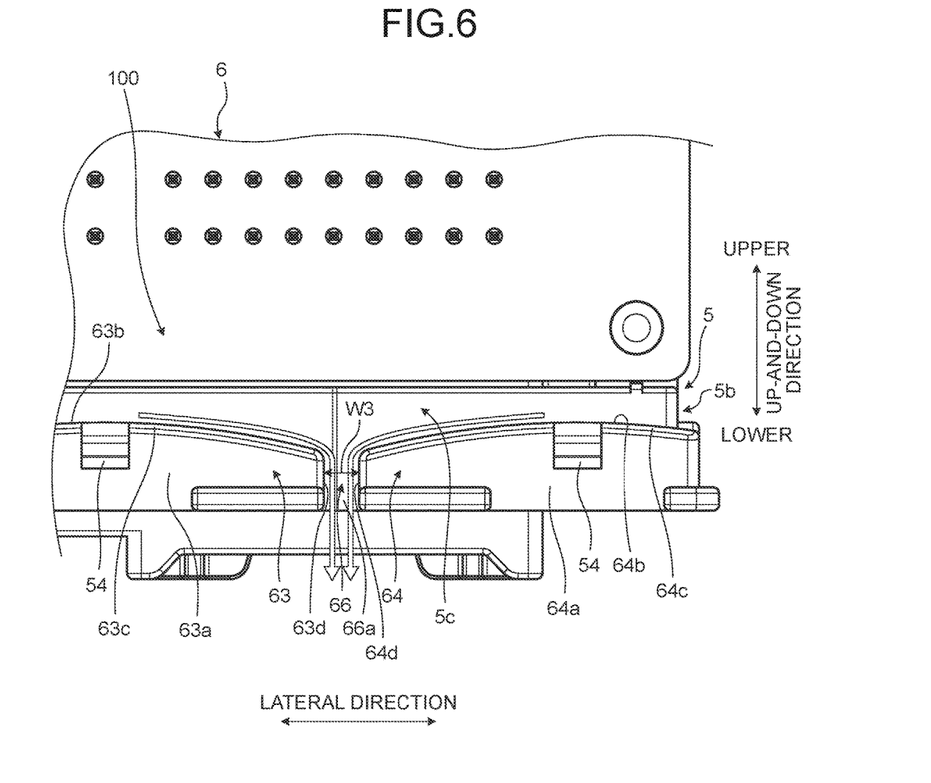
FIG. 6 is a front elevational view of the main components of the connector block according to the embodiment.
Figure 7:
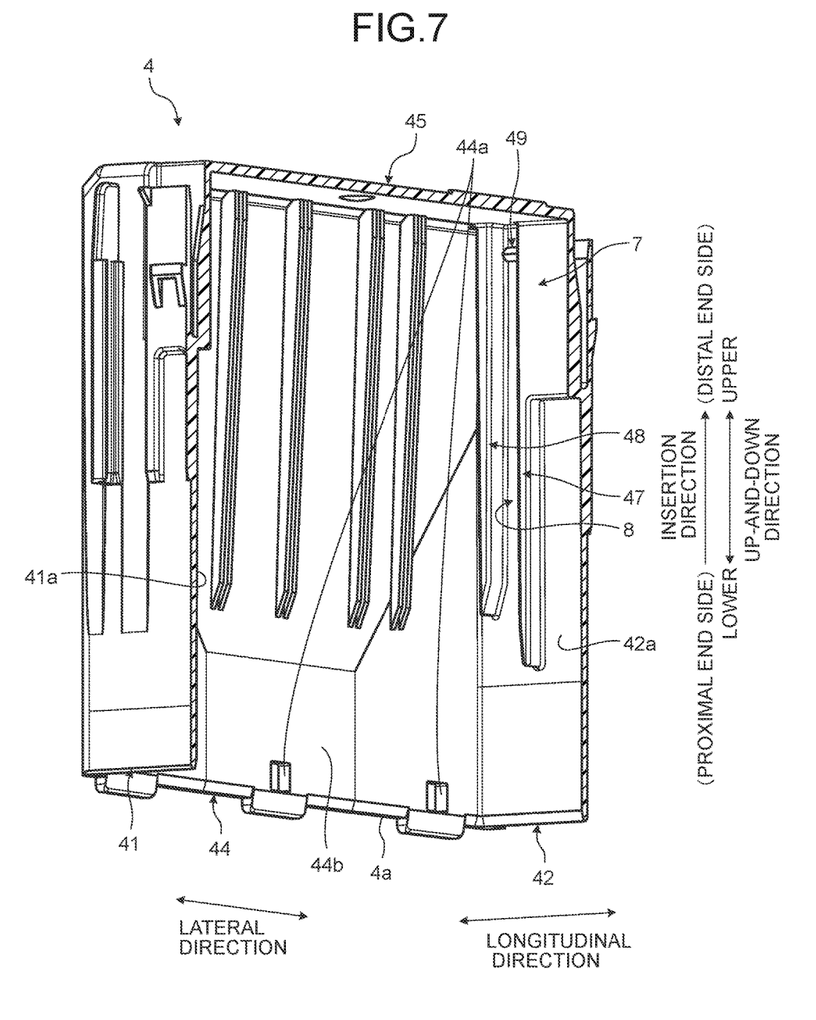
FIG. 7 is a sectional perspective view of a cover according to the embodiment.
Figure 8:
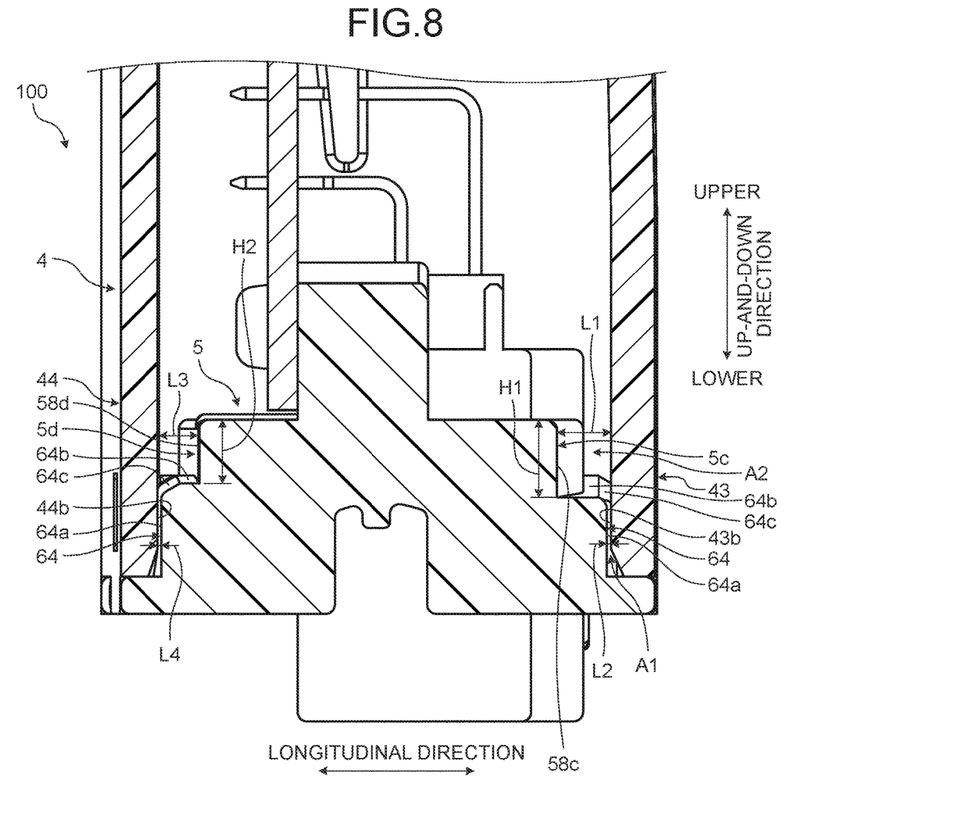
FIG. 8 is a sectional view of an electronic component module according to the embodiment.

The following describes the embodiment with reference to FIGS. 1 to 8. The present embodiment relates to a water drainage structure, an electronic component module, and an electrical connection box. FIG. 1 is a perspective view of the electrical connection box according to the embodiment. FIG. 2 is a bottom view of the electrical connection box according to the embodiment. FIG. 3 is a perspective view of a substrate and a connector block according to the embodiment. FIG. 4 is a plan view of the substrate and the connector block according to the embodiment. FIG. 5 is a side elevational view of main components of the connector block according to the embodiment. FIG. 6 is a front elevational view of the main components of the connector block according to the embodiment. FIG. 7 is a sectional perspective view of a cover according to the embodiment. FIG. 8 is a sectional view of the electronic component module according to the embodiment. FIG. 7 is a sectional view taken along line VII-VII in FIG. 1. FIG. 8 is a sectional view taken along line VIII-VIII in FIG. 1.

As illustrated in FIG. 1, this electrical connection box 1 according to the embodiment includes a frame 2 and an electronic component module 3. The electrical connection box 1 in the present embodiment will be described as exemplarily being mounted on a vehicle. The electrical connection box 1 constitutes with wires W a wiring harness WH. The wiring harness WH is mounted on a vehicle, such as an automobile, and connects different units mounted on the vehicle. The wiring harness WH includes a plurality of wires W used for power supply and signal communication. The wires W each have a first end connected to the electronic component module 3 housed in the electrical connection box 1. The wires W each have a second end connected via, for example, a connector with the different units (external devices) including a battery and electric components.

The electronic component module 3 in the embodiment includes a water drainage structure 100 to be described below. The electronic component module 3 can thereby discharge water that has entered through a gap between a cover 4 and a connector block 5 by, for example, a capillary phenomenon into an internal space to an outside. The water drainage structure 100 includes the connector block 5 and the cover 4. The connector block 5 includes side wall portions 5a, 5b, 5c, and 5d (see FIG. 4). The side wall portions 5a, 5b, 5c, and 5d have upper opposing surfaces 58a, 58b, 58c, and 58d and include raised portions 50 (first raised portions 61, second raised portions 62, third raised portions 63, and fourth raised portions 64). The raised portions 50 have lower opposing surfaces 61a, 62a, 63a, and 64a, step surfaces 61b, 62b, 63b, and 64b, and passage portions 65 and 66. The step surfaces 61b, 62b, 63b, and 64b guide water that has flowed upward through a gap (e.g., a gap A1 in FIG. 8) between the lower opposing surfaces 61a, 62a, 63a, and 64a and the cover 4 by a capillary phenomenon into the passage portions 65 and 66 and discharge the water. The water drainage structure 100 in the embodiment can thus appropriately protect an electronic component held at an upper portion of the connector block 5.

The frame 2 illustrated in FIGS. 1 and 2 holds thereinside the cover 4 of the electronic component module 3. The frame 2 is integrally molded from, for example, a synthetic resin. The frame 2 is a cylindrical member having a planar shape of a polygon, for example, a rectangle. The electronic component module 3 is inserted into, or withdrawn from, the frame 2 by way of an opening in the frame 2. The electrical connection box 1 includes an upper cover or a lower cover, not illustrated, that closes the opening in the frame 2. The frame 2, together with the upper cover or the lower cover, constitutes a closed housing space in which the electronic component module 3 is housed.

The electronic component module 3 includes the cover 4 and the connector block 5. The cover 4 is a housing member substantially having a shape of a rectangular parallelepiped. The cover 4 is integrally molded from, for example, a synthetic resin. The cover 4 includes thereinside a housing portion 7 (see FIG. 7) in which a substrate 6 to be described later is housed. The cover 4 has a first side wall 41, a second side wall 42, a third side wall 43, a fourth side wall 44, and a depth wall 45. The first side wall 41, the second side wall 42, the third side wall 43, and the fourth side wall 44 constitute a cylindrical portion having a substantially rectangular cross section. The depth wall 45 closes a first end of the cylindrical portion formed by the first side wall 41, the second side wall 42, the third side wall 43, and the fourth side wall 44. The cylindrical portion has an open second end. To state the foregoing differently, the first side wall 41, the second side wall 42, the third side wall 43, the fourth side wall 44, and the depth wall 45 constitute a rectangular cylinder having one open end.

The electronic component module 3 in the embodiment is mounted on the vehicle in a position such that the cylindrical portion formed by the first side wall 41, the second side wall 42, the third side wall 43, and the fourth side wall 44 has an axis extending in a up-and-down direction and an opening in the cover 4 faces downward. In the following, the "up-and-down direction" refers to a direction extending in a vehicle up-and-down direction under a condition in which the electrical connection box 1 including the electronic component module 3 is mounted on the vehicle. It is noted that, when the vehicle is inclined, the up-and-down direction may differ from the vertical direction. In this specification, a sectional shape of the cover 4 in a plane orthogonal to the up-and-down direction has a long edge direction that is referred to as a "lateral direction" and a short edge direction that is referred to as a "longitudinal direction". The lateral direction and the longitudinal direction are orthogonal to each other.

The first side wall 41 and the second side wall 42 face each other in the lateral direction. The third side wall 43 and the fourth side wall 44 face each other in the longitudinal direction. The third side wall 43 and the fourth side wall 44 each have a first end in the lateral direction connected with the first side wall 41. The third side wall 43 and the fourth side wall 44 each have a second end in the lateral direction connected with the second side wall 42. The first side wall 41 and the second side wall 42 each have an engagement portion 46 disposed on an outer surface thereof. The engagement portion 46 is a protrusion having a substantially U-shaped planar shape. The frame 2 has engagement protrusions associated with the engagement portions 46. The engagement portions 46 engage the engagement protrusions of the frame 2, causing the cover 4 to be connected with the frame 2.

The third side wall 43 has a plurality of engagement holes 43a formed near a lower end thereof. The engagement holes 43a are disposed along a lower edge of the third side wall 43, each being spaced apart from each other. The third side wall 43 in the present embodiment has three engagement holes 43a. One of the three engagement holes 43a is disposed at a center in the lateral direction and the other two of the three engagement holes 43a are disposed at a first end side and a second end side, respectively. The fourth side wall 44 has engagement holes 44a (see FIG. 7) that are similar to the engagement holes 43a.

As illustrated in FIG. 2, the frame 2 includes a module housing portion 2a in which the electronic component module 3 is housed. The frame 2 in the present embodiment includes a plurality of module housing portions 2a. The electronic component module 3 including the cover 4 is inserted in one of the module housing portions 2a and held by the frame 2.

The connector block 5 is a block-shaped member that closes the opening in the cover 4. The connector block 5 is integrally molded from, for example, a synthetic resin. The connector block 5 has an end face 51. A plurality of connector engagement portions 52 are disposed on the end face 51. The connector engagement portions 52 are each a frame-shaped element protruding from the end face 51. The connector engagement portions 52 each have a recess 52a in which a mating male connector fits. A plurality of pins 53 protrude from a bottom portion of the recess 52a. The pins 53 are electrically connected to mating connector pins.

As illustrated in FIG. 3, the connector block 5 holds the substrate 6 on an upper portion thereof. The substrate 6 is, for example, a printed board having electric circuit wires formed on a surface thereof. The substrate 6 in the present embodiment has a rectangular planar shape having corners chamfered arcuately. The substrate 6 has a lower end fixed to fixing portions 56 disposed on an upper portion of the connector block 5 through fixing members, such as screws. The fixing portions 56 are disposed on both ends in the lateral direction across the pins 53. In the descriptions that follow, a side of the substrate 6 fixed to the connector block 5 will be referred to as a "proximal end side" and a free end side opposite to the side fixed to the connector block 5 will be referred to as a "distal end side". The substrate 6 and the connector block 5 are inserted in the cover 4 with a distal end surface 6d first. In a condition in which the electrical connection box 1 is mounted on the vehicle, the cover 4 integrally covers resistors 6b, relays 6c, the substrate 6, and the connector block 5 from above.

The substrate 6 has a plurality of through holes 6a formed therein on the proximal end side. The through holes 6a pass through the substrate 6 in a wall thickness direction of the substrate 6. The electrically conductive pins 53 are passed through the respective through holes 6a. The pins 53 are each a bar-shaped or plate-shaped member bent at right angles. Each of the pins 53 has a first end inserted from a first surface side of the substrate 6 into the corresponding one of the through holes 6a and a second end protruding to the inside of the recess 52a in the connector block 5 as described previously. Each of the pins 53 is electrically connected with the electric circuit of the substrate 6 through soldering. The resistors 6b, the relays 6c, and other electronic components are electrically connected with the electric circuit of the substrate 6, so that an electronic circuit is generally configured.

The connector block 5 includes a first side wall portion 5a, a second side wall portion 5b, a third side wall portion 5c, and a fourth side wall portion 5d. The first side wall portion 5a and the second side wall portion 5b each extend in the short edge direction in the connector block 5, specifically, extend in the longitudinal direction in the connector block 5. Each of the first side wall portion 5a and the second side wall portion 5b faces in the lateral direction. The first side wall portion 5a faces the first side wall 41 of the cover 4. The second side wall portion 5b faces the second side wall 42 of the cover 4.

The third side wall portion 5c and the fourth side wall portion 5d each extend in the long edge direction in the connector block 5, specifically, extend in the lateral direction in the connector block 5. Each of the third side wall portion 5c and the fourth side wall portion 5d faces in the longitudinal direction. The third side wall portion 5c faces the third side wall 43 of the cover 4. The fourth side wall portion 5d faces the fourth side wall 44 of the cover 4.

As illustrated in FIGS. 3 and 4, the connector block 5 includes the raised portions 50. The raised portions 50 are provided on the first side wall portion 5a, the second side wall portion 5b, the third side wall portion 5c, and the fourth side wall portion 5d of the connector block 5 and raised laterally around the connector block 5. More specifically, the first side wall portion 5a and the second side wall portion 5b each include the first raised portion 61 and the second raised portions 62. The first raised portion 61 is disposed at a center in a width direction of each of the first side wall portion 5a and the second side wall portion 5b, specifically, at a center in the longitudinal direction. The second raised portions 62 are disposed adjacent to the first raised portion 61 in the longitudinal direction. In the connector block 5 in the present embodiment, the second raised portions 62 are disposed, with respect to the first raised portion 61, on respective sides of the third side wall portion 5c and the fourth side wall portion 5d in the longitudinal direction. A passage portion 65 that extends in the up-and-down direction is disposed between the first raised portion 61 and each of the second raised portions 62. The passage portions 65 provide communication between a space above the first raised portions 61 and the second raised portions 62 and a space below the first raised portions 61 and the second raised portions 62.

The third side wall portion 5c and the fourth side wall portion 5d each include the third raised portion 63 and the fourth raised portions 64. The third raised portion 63 is disposed at a center in a width direction of each of the third side wall portion 5c and the fourth side wall portion 5d, specifically, at a center in the lateral direction. The fourth raised portions 64 are disposed adjacent to the third raised portion 63 in the lateral direction. In the connector block 5 in the present embodiment, the fourth raised portions 64 are disposed, with respect to the third raised portion 63, on respective sides of the first side wall portion 5a and the second side wall portion 5b in the lateral direction. It is noted that the second raised portions 62 and the fourth raised portions 64 are connected to each other at corners of the connector block 5.

Each of the first raised portions 61, the second raised portions 62, the third raised portions 63, and the fourth raised portions 64 is formed to extend from a lower end of each of the first side wall portion 5a, the second side wall portion 5b, the third side wall portion 5c, and the fourth side wall portion 5d to a predetermined height below an upper end of each of the first side wall portion 5a, the second side wall portion 5b, the third side wall portion 5c, and the fourth side wall portion 5d. To state the foregoing differently, an upper end portion of each of the first side wall portion 5a, the second side wall portion 5b, the third side wall portion 5c, and the fourth side wall portion 5d connects to a skirt portion of each of the first raised portions 61, the second raised portions 62, the third raised portions 63, and the fourth raised portions 64, to thereby form a wall surface one stage lower. In the descriptions that follow, wall surfaces above the first raised portions 61, the second raised portions 62, the third raised portions 63, and the fourth raised portions 64 in the first side wall portion 5a, the second side wall portion 5b, the third side wall portion 5c, and the fourth side wall portion 5d will be referred to as the upper opposing surfaces 58a, 58b, 58c, and 58d. The first upper opposing surface 58a is a wall surface above the first raised portion 61 and the second raised portions 62 in the first side wall portion 5a. The second upper opposing surface 58b is a wall surface above the first raised portion 61 and the second raised portions 62 in the second side wall portion 5b. The third upper opposing surface 58c is a wall surface above the third raised portion 63 and the fourth raised portions 64 in the third side wall portion 5c. The fourth upper opposing surface 58d is a wall surface above the third raised portion 63 and the fourth raised portions 64 in the fourth side wall portion 5d. Specifically, the first raised portions 61, the second raised portions 62, the third raised portions 63, and the fourth raised portions 64 are raised from lower portions of the first upper opposing surface 58a, the second upper opposing surface 58b, the third upper opposing surface 58c, and the fourth upper opposing surface 58d toward inner wall portions 41a, 42a, 43b, and 44b of the cover 4.

The first raised portions 61 each have the first lower opposing surface 61a and the first step surface 61b. The second raised portions 62 each have the second lower opposing surface 62a and the second step surface 62b. The first and second lower opposing surfaces 61a and 62a assume distal end surfaces of the first and second raised portions 61 and 62. The first and second lower opposing surfaces 61a and 62a of the first side wall portion 5a face the first side wall 41 of the cover 4. The first and second lower opposing surfaces 61a and 62a of the second side wall portion 5b face the second side wall 42 of the cover 4. The first lower opposing surface 61a and the second lower opposing surface 62a exist in an identical plane. The first step surfaces 61b of the first raised portions 61 connect the first and second upper opposing surfaces 58a and 58b with the first lower opposing surfaces 61a. The second step surfaces 62b of the second raised portions 62 connect the first and second upper opposing surfaces 58a and 58b with the second lower opposing surfaces 62a. The first and second step surfaces 61b and 62b extend in a width direction of the first and second side wall portions 5a and 5b and face upward.

FIG. 5 illustrates a configuration of the first raised portion 61 and the second raised portions 62 of the first side wall portion 5a. It is noted that the first raised portion 61 and the second raised portions 62 of the second side wall portion 5b are similarly configured. As illustrated in FIG. 5, the first step surface 61b extends in the width direction of the first side wall portion 5a and is inclined toward the passage portions 65. The first step surface 61b in the present embodiment connects to the passage portions 65 at both ends in the width direction of the first side wall portion 5a. The first step surface 61b is inclined from the passage portions 65 on both sides upwardly toward a center in a direction in which the first step surface 61b extends. Additionally, the first step surface 61b in the present embodiment is curved upwardly. More specifically, the first step surface 61b is curved downwardly toward the passage portions 65 on both sides in the width direction of the first side wall portion 5a.

The second step surface 62b extends substantially horizontally in the width direction of the first side wall portion 5a. The second step surface 62b may be inclined or curved downwardly toward the passage portion 65 in the width direction of the first side wall portion 5a. The first step surface 61b and the second step surface 62b have edge portions 61c and 62c. The edge portions 61c and 62c are inclined downwardly toward distal end sides in a raised direction. The edge portions 61c and 62c assume edge portions on the sides of the first lower opposing surface 61a and the second lower opposing surfaces 62a in the first step surface 61b and the second step surface 62b, respectively.

The passage portions 65 in the present embodiment assume groove portions formed in the raised portions 50. The passage portions 65 are each surrounded from three directions by a side surface 61d of the first raised portion 61, a side surface 62d of the second raised portion 62, and a bottom surface 65a. Specifically, the side surface 61d of the first raised portion 61 is on the side adjacent to the second raised portion 62. The side surface 62d of the second raised portion 62 is on the side adjacent to the first raised portion 61. The side surface 61d and the side surface 62d are connected with each other by the bottom surface 65a. The passage portion 65 has a width W2 that is defined such that water on the first step surface 61b and the second step surface 62b can be discharged to a space inferior thereto. The bottom surfaces 65a of the passage portions 65 in the present embodiment are continuous with the first upper opposing surface 58a and the second upper opposing surface 58b and exist in planes identical to the planes in which the first upper opposing surface 58a and the second upper opposing surface 58b exist. The side surfaces 61d have upper ends that are continuous with the first step surface 61b. The side surfaces 62d have upper ends that are continuous with the second step surfaces 62b. Specifically, the passage portions 65 have upper ends that are continuous with the first step surface 61b and the second step surfaces 62b. The passage portions 65 have lower ends communicating with a space below the connector block 5. Thus, the passage portions 65 cause the water on the first step surface 61b and the second step surface 62b to be discharged to the space below the connector block 5.

FIG. 6 illustrates a configuration of the third raised portion 63 and the fourth raised portions 64 of the third side wall portion 5c. It is noted that the third raised portion 63 and the fourth raised portions 64 of the fourth side wall portion 5d are similarly configured. As illustrated in FIG. 6, the third raised portion 63 has the third lower opposing surface 63a and the third step surface 63b. The fourth raised portions 64 each have the fourth lower opposing surface 64a and the fourth step surface 64b. The third lower opposing surface 63a and the fourth lower opposing surface 64a assume distal end surfaces of the third raised portion 63 and the fourth raised portion 64, respectively. The third lower opposing surface 63a and the fourth lower opposing surfaces 64a of the third side wall portion 5c face the third side wall 43 of the cover 4. The third lower opposing surface 63a and the fourth lower opposing surfaces 64a of the fourth side wall portion 5d face the fourth side wall 44 of the cover 4.

As illustrated in FIG. 4, in the third side wall portion 5c, the third lower opposing surface 63a and the fourth lower opposing surfaces 64a are in an identical plane. Meanwhile, in the fourth side wall portion 5d, the fourth lower opposing surfaces 64a are inclined with respect to the third lower opposing surface 63a. More specifically, the fourth lower opposing surfaces 64a are each inclined toward the third side wall portion 5c as it goes farther away in the lateral direction from the third lower opposing surface 63a.

The third step surfaces 63b and the fourth step surfaces 64b extend in the width direction of the third side wall portion 5c and the fourth side wall portion 5d and are inclined toward the passage portions 66. The third step surfaces 63b and the fourth step surfaces 64b are each inclined upwardly toward a center in a direction in which the third step surfaces 63b and the fourth step surfaces 64b extend. Additionally, the third step surfaces 63b and the fourth step surfaces 64b in the present embodiment are each curved upwardly. More specifically, the third step surface 63b and the fourth step surfaces 64b are each curved downwardly toward the passage portion 66 in the width direction of the third side wall portion 5c. To state the foregoing differently, as viewed from a direction orthogonal to the third lower opposing surface 63a and the fourth lower opposing surfaces 64a, the third step surface 63b and the fourth step surfaces 64b are each curved upwardly toward the center from both ends. The third step surfaces 63b and the fourth step surfaces 64b have edge portions 63c and 64c. The edge portions 63c and 64c are inclined downwardly toward distal end sides in a raised direction of the third raised portions 63 and the fourth raised portions 64. The edge portions 63c and 64c assume edge portions on the sides of the third lower opposing surfaces 63a and the fourth lower opposing surfaces 64a in the third step surfaces 63b and the fourth step surfaces 64b, respectively.

The passage portions 66 in the present embodiment assume groove portions formed in the raised portions 50. The passage portions 66 are each surrounded from three directions by a side surface 63d of the third raised portion 63, a side surface 64d of the fourth raised portion 64, and a bottom surface 66a. Specifically, the side surface 63d of the third raised portion 63 is on the side adjacent to the fourth raised portion 64. The side surface 64d of the fourth raised portion 64 is on the side adjacent to the third raised portion 63. The side surface 63d and the side surface 64d are connected with each other by the bottom surface 66a. The passage portion 66 has a width W3 that is defined such that water on the third step surface 63b and the fourth step surface 64b can be discharged to a space inferior thereto. The bottom surfaces 66a of the passage portions 66 in the present embodiment are continuous with the third upper opposing surface 58c and the fourth upper opposing surface 58d and exist in planes identical to the planes in which the third upper opposing surface 58c and the fourth upper opposing surface 58d exist. The side surfaces 63d have upper ends that are continuous with the third step surface 63b. The side surfaces 64d have upper ends that are continuous with the fourth step surfaces 64b. Specifically, the passage portions 66 have upper ends that are continuous with the third step surface 63b and the fourth step surfaces 64b. The passage portions 66 have lower ends communicating with a space below the connector block 5. Thus, the passage portions 66 cause the water on the third step surface 63b and the fourth step surfaces 64b to be discharged to the space below the connector block 5.

The connector block 5 has engagement protrusions 54. The engagement protrusions 54 are associated with the engagement holes 43a and the engagement holes 44a (see FIGS. 1 and 7) in the cover 4. The engagement protrusions 54 are disposed on the third side wall portion 5c and the fourth side wall portion 5d of the connector block 5. The engagement protrusions 54 protrude in the longitudinal direction from the third lower opposing surfaces 63a and the fourth lower opposing surfaces 64a. The engagement protrusions 54 in the present embodiment are disposed at upper end portions of the third lower opposing surfaces 63a and upper end portions of the fourth lower opposing surfaces 64a. The engagement protrusions 54 have upper surfaces that are continuous with the edge portions 63c and the edge portions 64c and are inclined similarly to the edge portions 63c and the edge portions 64c. The engagement protrusions 54 engage the engagement holes 43a and the engagement holes 44a in the cover 4 to thereby connect the cover 4 with the connector block 5.

As illustrated in FIG. 7, the cover 4 includes thereinside the housing portion 7. The housing portion 7 is a space surrounded by the first side wall 41, the second side wall 42, the third side wall 43 (see FIG. 1), the fourth side wall 44, and the depth wall 45. To state the foregoing differently, the housing portion 7 assumes an internal space of the closed-bottom cylindrical cover 4. The first side wall 41 and the second side wall 42 of the cover 4 each include a first guide portion 47, a second guide portion 48, and a protruding portion 49. The first guide portion 47, the second guide portion 48, and the protruding portion 49 are disposed on each of the inner wall portion 41a and the inner wall portion 42a of the first side wall 41 and the second side wall 42, respectively. The first guide portion 47 and the second guide portion 48 extend along the up-and-down direction, or a depth direction of the housing portion 7. The first guide portion 47 and the second guide portion 48 face each other in the longitudinal direction. The first guide portion 47 and the second guide portion 48 form protrusions protruding inwardly in the inner wall portion 41a and the inner wall portion 42a of the first side wall 41 and the second side wall 42, respectively. The first guide portion 47 and the second guide portion 48 are formed integrally with the first side wall 41 and the second side wall 42.

A groove portion 8 exists between the first guide portion 47 and the second guide portion 48. The first guide portions 47 and the second guide portions 48 guide the substrate 6 inserted in the housing portion 7 into the groove portions 8. The protruding portions 49 form protrusions protruding inwardly in the inner wall portion 41a and the inner wall portion 42a of the first side wall 41 and the second side wall 42, respectively. The protruding portions 49 are formed integrally with the first side wall 41 and the second side wall 42. The inner wall portion 41a and the inner wall portion 42a assume wall surfaces that face side surfaces 6e and 6f (see FIG. 3) of the substrate 6 inserted in the housing portion 7. The protruding portion 49 in the present embodiment is a triangular prism extending in the longitudinal direction. A distance between a distal end of the protruding portion 49 of the first side wall 41 and a distal end of the protruding portion 49 of the second side wall 42 is narrower than a width W1 of the substrate 6 (see FIG. 3). The protruding portion 49 is a collapsible rib that is plastically deformed by contact of the substrate 6 being inserted into the housing portion 7.

The substrate 6 is inserted via an opening 4a in the cover 4 toward the depth wall 45. More specifically, the connector block 5 and the substrate 6 are inserted in the housing portion 7 through the opening 4a toward the depth wall 45 with the distal end surface 6d of the substrate 6 facing the opening 4a. The housing portion 7 of the cover 4 houses thereinside the inserted substrate 6 and at least part of the connector block 5. The connector block 5 inserted in the housing portion 7 closes the opening 4a in the cover 4, thereby forming a closed space in which the substrate 6 is housed inside the cover 4.

When the connector block 5 is inserted in the housing portion 7, as illustrated in FIG. 1, the engagement protrusions 54 of the connector block 5 fit into the engagement holes 43a and 44a from the inside of the cover 4, engaging the engagement holes 43a and 44a. The engagement protrusions 54 that have engaged the engagement holes 43a and 44a restrict the connector block 5 from slipping out of the housing portion 7.

When the substrate 6 being inserted into the housing portion 7 abuts on the protruding portions 49, portions of the protruding portions 49 abutting on the substrate 6 are plastically deformed. Material (strength), shape, dimensions, and other factors of the protruding portions 49 are set such that at least parts on the distal end sides of the protruding portions 49 are plastically deformed to collapse by the contact with the substrate 6. In addition, preferably, material (modulus of elasticity), shape, dimensions, and other factors of the protruding portions 49 are set such that at least parts on the proximal end sides of the protruding portions 49 are plastically deformed to thereby allow the contact condition between the protruding portions 49 and the substrate 6 to be maintained. When the insertion of the substrate 6 into the housing portion 7 is completed, grooves are formed in the protruding portions 49 through the plastic deformation, for clamping the substrate 6 from both ends in the longitudinal direction. Preferably, the grooves of the protruding portions 49 contact the substrate 6 to thereby hold the substrate 6 in place. A gap may nonetheless exist between the grooves and the substrate 6.

Reference is made to FIG. 8. The third side wall portion 5c faces the inner wall portion 43b of the cover 4. The fourth side wall portion 5d faces the inner wall portion 44b of the cover 4. Under a condition in which the connector block 5 and the cover 4 are connected with each other (hereinafter referred to simply as a "connected condition"), the third upper opposing surface 58c of the third side wall portion 5c faces the inner wall portion 43b of the third side wall 43 at a first distance L1. The first distance L1 has such a value as to disable a lift of water by a capillary phenomenon. In the connected condition, the fourth lower opposing surfaces 64a of the third side wall portion 5c face the inner wall portion 43b at a second distance L2 that is shorter than the first distance L1. The second distance L2 may have such a value as to enable a lift of water by a capillary phenomenon. In terms of enhanced dustproofness and waterproofness, a shorter distance is preferable in facing portions at which the cover 4 faces the connector block 5. A narrow gap between the cover 4 and the connector block 5 can, however, cause water to run up the gap by a capillary phenomenon to enter the housing portion 7. Thus, preferably, the water that has entered the housing portion 7 is discharged to the outside without reaching the electronic component.

In the water drainage structure 100 according to the present embodiment, the third upper opposing surface 58c faces the inner wall portion 43b at the first distance L1. In the description that follows, the space between the fourth lower opposing surfaces 64a and the inner wall portion 43b will be referred to as a "gap A1" and the space between the third upper opposing surface 58c and the inner wall portion 43b will be referred to as a "gap A2". Should water rise up to the gap A2 through the gap A1 by a capillary phenomenon, that water does not rise further up the gap A2 by a capillary phenomenon. The fourth step surfaces 64b function as drainage channels for guiding the water that has risen up to the gap A2 to the passage portions 66. The fourth step surfaces 64b are inclined so that the water flows toward the passage portions 66. Thus, the water that has risen up to the gap A2 is guided from the fourth step surfaces 64b to the passage portions 66 and is discharged to the space below the cover 4 via the passage portions 66.

In the third side wall portion 5c, a distance between the third lower opposing surface 63a and the inner wall portion 43b in the connected condition is the second distance L2 as with the above-described distance between fourth lower opposing surfaces 64a and the inner wall portion 43b. The third step surface 63b guides the water that has risen by, for example, a capillary phenomenon to the passage portions 66 and discharges the water as with the fourth step surfaces 64b. It is noted that the first distance L1 and the second distance L2 do not necessarily have to be a fixed value. For example, the second distance L2 between the third lower opposing surfaces 63a and the inner wall portion 43b may differ from the second distance L2 between the fourth lower opposing surfaces 64a and the inner wall portion 43b.

The fourth side wall portion 5d has a water drainage function identical to the water drainage function achieved by the third side wall portion 5c. Specifically, in the connected condition, the fourth upper opposing surface 58d faces the inner wall portion 44b of the fourth side wall 44 at a first distance L3. The first distance L3 has such a value as to disable a lift of water by a capillary phenomenon. The first distance L3 may have a value identical to, or different from, the value of the first distance L1. In the connected condition, the fourth lower opposing surfaces 64a face the inner wall portion 44b at a second distance L4 that is shorter than the first distance L3. The second distance L4 may have such a value as to enable a lift of water by a capillary phenomenon. The second distance L4 may have a value identical to, or different from, the value of the second distance L2. A water path formed by the third upper opposing surface 58c, the fourth upper opposing surface 58d, the third side wall 43, the fourth side wall 44, the third step surfaces 63b, and the fourth step surfaces 64b functions as a storage portion that temporarily stores the water that has risen up by a capillary phenomenon and discharges the stored water to the passage portions 66. A height H1 of the third upper opposing surface 58c and a height H2 of the fourth upper opposing surface 58d are set as appropriate such that water levels on the third step surfaces 63b and the fourth step surfaces 64b do not exceed upper ends of the third upper opposing surface 58c and the fourth upper opposing surface 58d. It is further noted that the third step surfaces 63b, the fourth step surfaces 64b, and the passage portions 66 can also discharge dew condensation water on the inner wall portions 41a, 42a, 43b, and 44b of the cover 4 to an outside space.

With the fourth side wall portion 5d, a distance between the third lower opposing surfaces 63a and the inner wall portion 44b in the connected condition is set to be the second distance L4 as with the distance between the fourth lower opposing surfaces 64a and the inner wall portion 44b. It is noted that the first distance L3 and the second distance L4 do not necessarily have to be a fixed value. For example, the second distance L4 between the third lower opposing surfaces 63a and the inner wall portion 44b may differ from the second distance L4 between the fourth lower opposing surfaces 64a and the inner wall portion 44b.

The first side wall portion 5a and the second side wall portion 5b have a water drainage function identical to the water drainage function of the third side wall portion 5c and the fourth side wall portion 5d. Specifically, in the connected condition, the first upper opposing surface 58a and the second upper opposing surface 58b face the inner wall portion 41a of the first side wall 41 and the inner wall portion 42a of the second side wall 42, respectively, at a first distance that disables the lift of water. In the connected condition, the first lower opposing surfaces 61a and the second lower opposing surfaces 62a face the inner wall portions 41a and 42a at a second distance that is shorter than the first distance. Water that has risen through gaps between the first lower opposing surfaces 61a and the inner wall portion 41a, and between the second lower opposing surfaces 62a and the inner wall portions 42a, is guided to the passage portions 65 by the first step surfaces 61b and the second step surfaces 62b of the first raised portions 61 and the second raised portions 62, respectively. The passage portions 65 discharge water that flows from the first step surfaces 61b and the second step surfaces 62b to a space below the cover 4. A water path formed by the first upper opposing surface 58a, the second upper opposing surface 58b, the first side wall 41, the second side wall 42, the first step surfaces 61b, and the second step surfaces 62b functions as a storage portion that temporarily stores the water that has risen up by a capillary phenomenon and discharges the stored water to the passage portions 65. A height of the first upper opposing surface 58a and the second upper opposing surface 58b is set as appropriate such that water levels on the first step surfaces 61b and the second step surfaces 62b do not exceed upper ends of the first upper opposing surface 58a and the second upper opposing surface 58b. It is noted that the first step surfaces 61b, the second step surfaces 62b, and the passage portions 65 can also discharge dew condensation water on the inner wall portions 41a, 42a, 43b, and 44b of the cover 4 to an outside space.

As described above, the water drainage structure 100 according to the present embodiment includes the connector block 5 that holds the electronic components 6b and 6c at the upper portion thereof and the cover 4 that integrally covers the electronic components 6b and 6c and the connector block 5 from above. The cover 4 includes the inner wall portions 41a, 42a, 43b, and 44b that face, in the connected condition, the side wall portions 5a, 5b, 5c, and 5d of the connector block 5. The side wall portions 5a, 5b, 5c, and 5d have the upper opposing surfaces 58a, 58b, 58c, and 58d that face the other wall portions (the inner wall portions 41a, 42a, 43b, and 44b) at a first distance that disables a lift of water by a capillary phenomenon and include the raised portions 50. The raised portions 50 are raised from the lower portions of the upper opposing surfaces 58a, 58b, 58c, and 58d toward the inner wall portions 41a, 42a, 43b, and 44b, respectively.

The raised portions 50 have the lower opposing surfaces 61a, 62a, 63a, and 64a that face the inner wall portions 41a, 42a, 43b, and 44b at a second distance that is shorter than the first distance, the step surfaces 61b, 62b, 63b, and 64b, and the passage portions 65 and 66. The step surfaces 61b, 62b, 63b, and 64b connect the lower opposing surfaces 61a, 62a, 63a, and 64a with the upper opposing surfaces 58a, 58b, 58c, and 58d. The step surfaces 61b, 62b, 63b, and 64b face upward and are inclined toward the passage portions 65 and 66. The passage portions 65 and 66 provide communication between a space above the raised portions 50 and a space below the raised portions 50 and connect to the step surfaces 61b, 62b, 63b, and 64b. In the water drainage structure 100 according to the present embodiment, the step surfaces 61b, 62b, 63b, and 64b and the passage portions 65 and 66 allow water, should it enter the housing portion 7 through the gaps between the wall portions that face each other at the second distance, to be discharged to the inferior space. Thus, the water drainage structure 100 can protect the electronic components held at the upper portion of the connector block 5 by restricting water from reaching the electronic components.

In the water drainage structure 100 according to the present embodiment, the second distance enables water to rise up by a capillary phenomenon. This arrangement enhances waterproofness and dustproofness of the gaps between the cover 4 and the connector block 5. Should water rise up to the gaps between the wall portions that face each other at the second distance by a capillary phenomenon, the step surfaces 61b, 62b, 63b, and 64b and the passage portions 65 and 66 can discharge that water to the inferior space.

The step surfaces 61b, 62b, 63b, and 64b extend in the width direction of the side wall portions 5a, 5b, 5c, and 5d and the inner wall portions 41a, 42a, 43b, and 44b and are curved downwardly toward the passage portions 65 and 66 in the width direction. Thus, even when the connector block 5 and the cover 4 are inclined as a result of the vehicle being inclined, the step surfaces 61b, 62b, 63b, and 64b are maintained in positions in which the step surfaces 61b, 62b, 63b, and 64b are inclined toward the passage portions 65 and 66. Appropriate water drainage capacity can thus be exhibited even when the electronic component module 3 and the electrical connection box 1 are inclined.

The electronic component module 3 in the present embodiment includes the resistors 6b, the relays 6c, and other electronic components, and the above-described water drainage structure 100. Additionally, the electrical connection box 1 includes the electronic component module 3 and the frame 2 that holds thereinside the electronic component module 3. Thus, the electronic component module 3 and the electrical connection box 1 according to the present embodiment can appropriately discharge water that penetrates through the gaps between the cover 4 and the connector block 5.

Modification

In the present embodiment, the side wall portions 5a, 5b, 5c, and 5d of the connector block 5 have the upper opposing surfaces 58a, 58b, 58c, and 58d and include the raised portions 50. Instead of, or in addition to, the foregoing arrangements, the upper opposing surfaces and the raised portions may be provided on the inner wall portions 41a, 42a, 43b, and 44b of the cover 4.

The first side wall portion 5a or the second side wall portion 5b may include a plurality of first raised portions 61. In this case, the passage portion 65 is disposed between the first raised portions 61 disposed to be adjacent to each other. Alternatively, the third side wall portion 5c or the fourth side wall portion 5d may include a plurality of third raised portions 63. In this case, the passage portion 66 is disposed between the third raised portions 63 disposed to be adjacent to each other.

Specific details disclosed in the embodiment and the modification described above may be combined and carried out as appropriate.

In the water drainage structure, the electronic component module, and the electrical connection box according to the embodiments, at least either a side wall portion or an inner wall portion has an upper opposing surface facing the other of the side wall portion and the inner wall portion at a first distance disabling a lift of water by a capillary phenomenon, and a raised portion raised from a lower portion of the upper opposing surface toward the other. The raised portion has a lower opposing surface that faces the other at a second distance that is shorter than the first distance. The raised portion further has a step surface that connects the lower opposing surface with the upper opposing surface and that faces upward. The raised portion further has a passage portion that provides communication between a space above the raised portion and a space below the raised portion and that connects to the step surface. The step surface is inclined toward the passage portion. The water drainage structure, the electronic component module, and the electrical connection box according to the embodiments achieve an effect of appropriately discharging water that has entered through a gap between a cover and a block using the step surface and the passage portion.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A water drainage structure, comprising:
    a block that holds an electronic component at an upper portion thereof; and
    a cover that has an inner wall portion facing a side wall portion of the block, the cover integrally covering the electronic component and the block from above, wherein
    at least either one of the side wall portion and the inner wall portion has an upper opposing surface facing the other of the side wall portion and the inner wall portion at a first distance disabling a lift of water by a capillary phenomenon, and a raised portion raised from a lower portion of the upper opposing surface toward the other,
    the raised portion has a lower opposing surface that faces the other at a second distance that is shorter than the first distance, a step surface that connects the lower opposing surface with the upper opposing surface and that faces upward, and a passage portion that provides communication between a space above the raised portion and a space below the raised portion and that connects to the step surface, and
    the step surface is inclined toward the passage portion.

2. The water drainage structure according to claim 1, wherein
    the second distance enables a lift of water by a capillary phenomenon.

3. The water drainage structure according to claim 2, wherein
    the step surface extends in a width direction of the side wall portion and the inner wall portion and is curved downwardly toward the passage portion in the width direction.

4. The water drainage structure according to claim 1, wherein
    the step surface extends in a width direction of the side wall portion and the inner wall portion and is curved downwardly toward the passage portion in the width direction.

5. An electronic component module, comprising:
    an electronic component;
    a block that holds the electronic component at an upper portion thereof; and
    a cover that has an inner wall portion facing a side wall portion of the block, the cover integrally covering the electronic component and the block from above, wherein
    at least either one of the side wall portion and the inner wall portion has an upper opposing surface facing the other of the side wall portion and the inner wall portion at a first distance disabling a lift of water by a capillary phenomenon, and a raised portion raised from a lower portion of the upper opposing surface toward the other,
    the raised portion has a lower opposing surface that faces the other at a second distance that is shorter than the first distance, a step surface that connects the lower opposing surface with the upper opposing surface and that faces upward, and a passage portion that provides communication between a space above the raised portion and a space below the raised portion and that connects to the step surface, and
    the step surface is inclined toward the passage portion.

6. An electrical connection box, comprising:
    an electronic component;
    a block that holds the electronic component at an upper portion thereof;
    a cover that has an inner wall portion facing a side wall portion of the block, the cover integrally covering the electronic component and the block from above; and
    a frame that holds thereinside an electronic component module including the electronic component, the block, and the cover, wherein
    at least either one of the side wall portion and the inner wall portion has an upper opposing surface facing the other of the side wall portion and the inner wall portion at a first distance disabling a lift of water by a capillary phenomenon, and a raised portion raised from a lower portion of the upper opposing surface toward the other,
    the raised portion has a lower opposing surface that faces the other at a second distance that is shorter than the first distance, a step surface that connects the lower opposing surface with the upper opposing surface and that faces upward, and a passage portion that provides communication between a space above the raised portion and a space below the raised portion and that connects to the step surface, and
    the step surface is inclined toward the passage portion.

* * * * *